Figure 1:
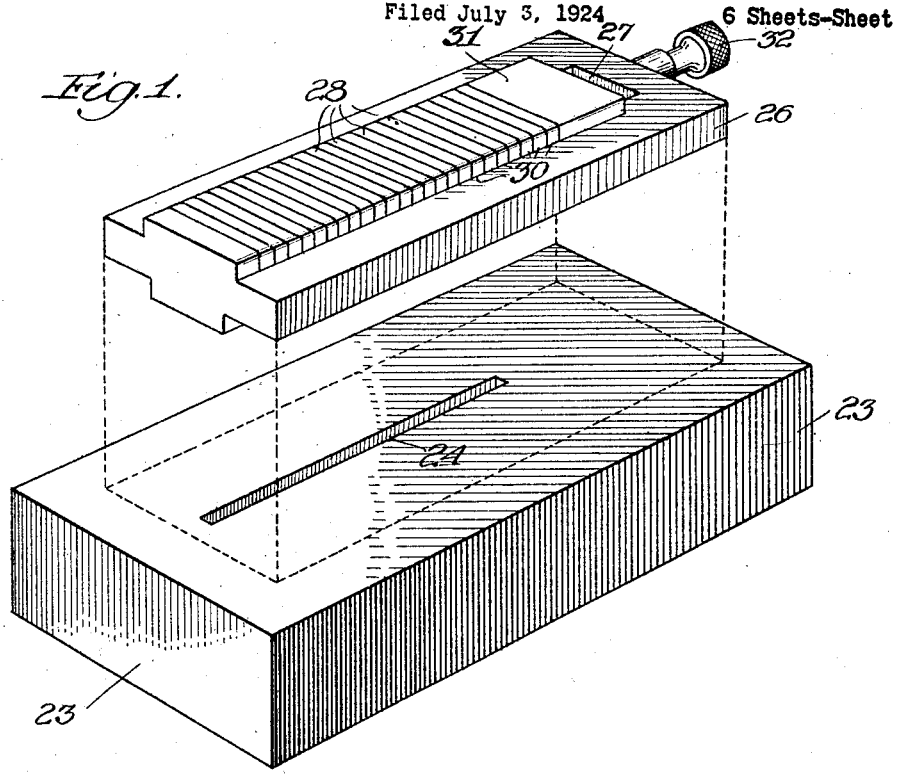

Nov. 15, 1927.

P. P. MERRILL

PRINTING MEMBER

Filed July 3, 1924    6 Sheets-Sheet 1

1,649,539

Inventor:
Philip P. Merrill,

Nov. 15, 1927.  
P. P. MERRILL  
PRINTING MEMBER  
Filed July 3, 1924  
1,649,539  
6 Sheets-Sheet 2
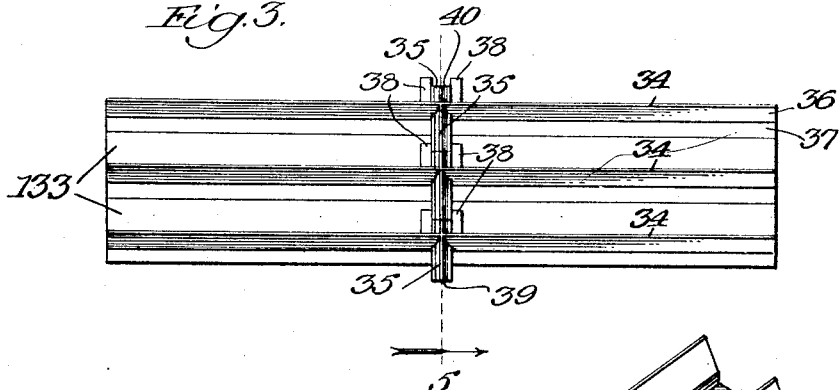
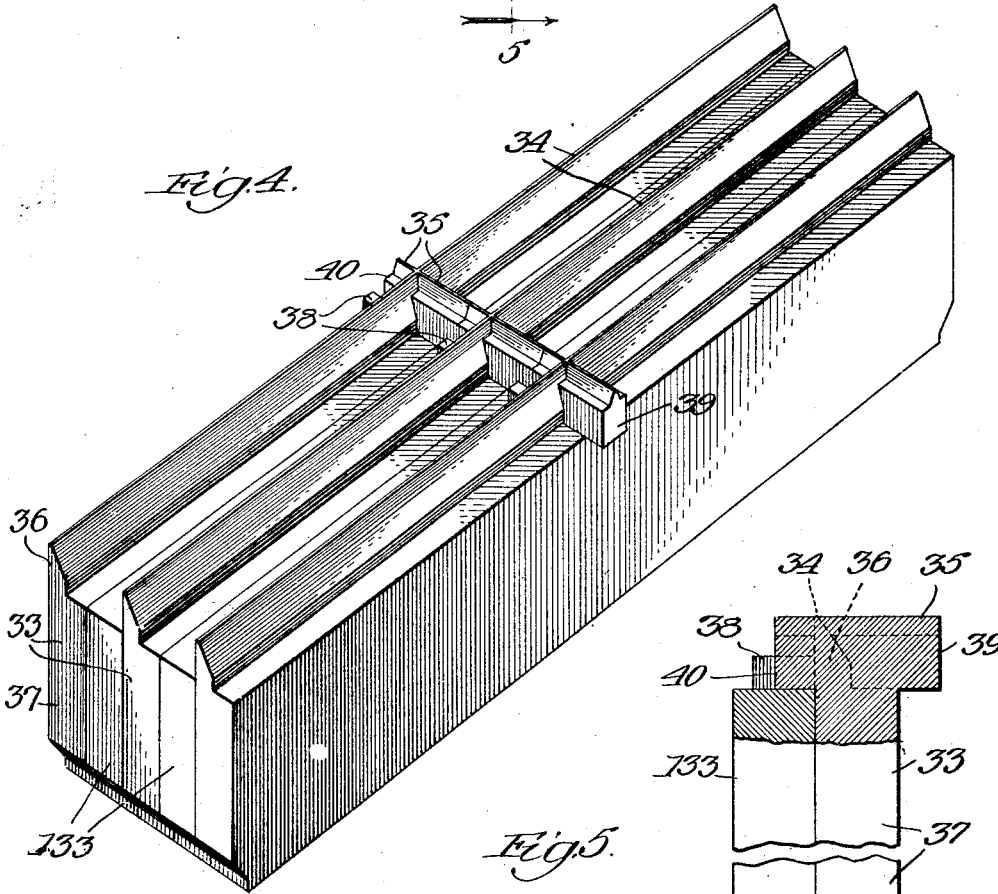
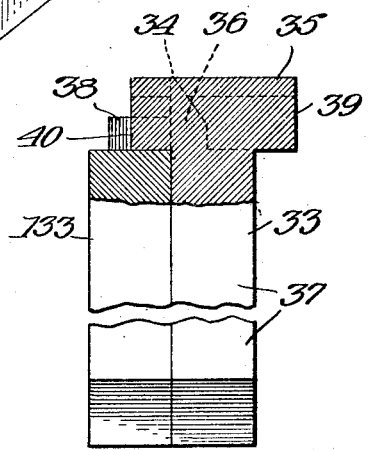
Inventor:  
Philip P. Merrill,  
By Dyrenforth, Lee, Chritton & Wiles,  
Attys Nov. 15, 1927. 1,649,539
P. P. MERRILL
PRINTING MEMBER
Filed July 3, 1924 6 Sheets-Sheet 3
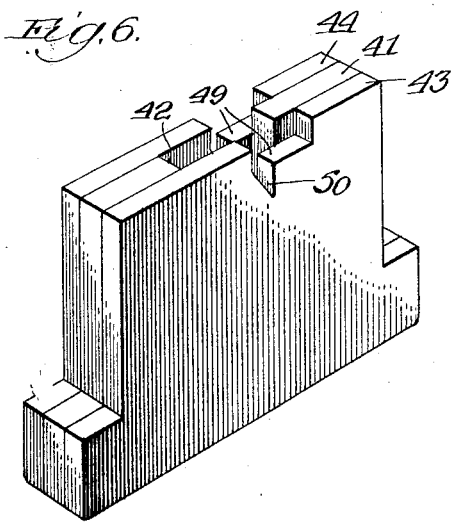
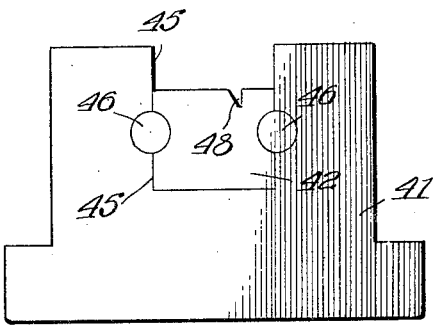
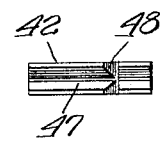
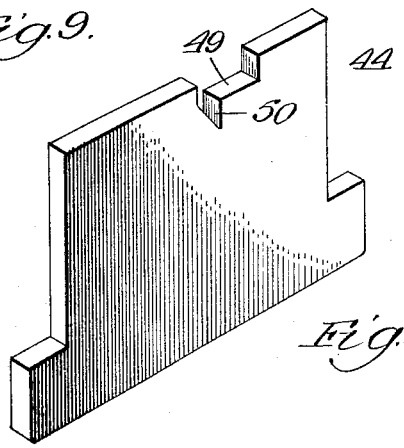
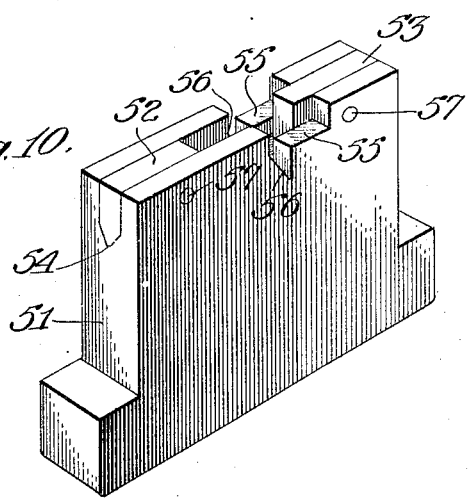
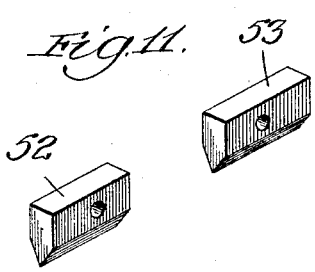
Inventor:
Philip P. Merrill
By Dyrenforth, Lee, Chritton & Wiles
Attys.

Nov. 15, 1927.　　　　　　　　　　　　　　　　1,649,539
P. P. MERRILL
PRINTING MEMBER
Filed July 3, 1924　　　6 Sheets-Sheet 4
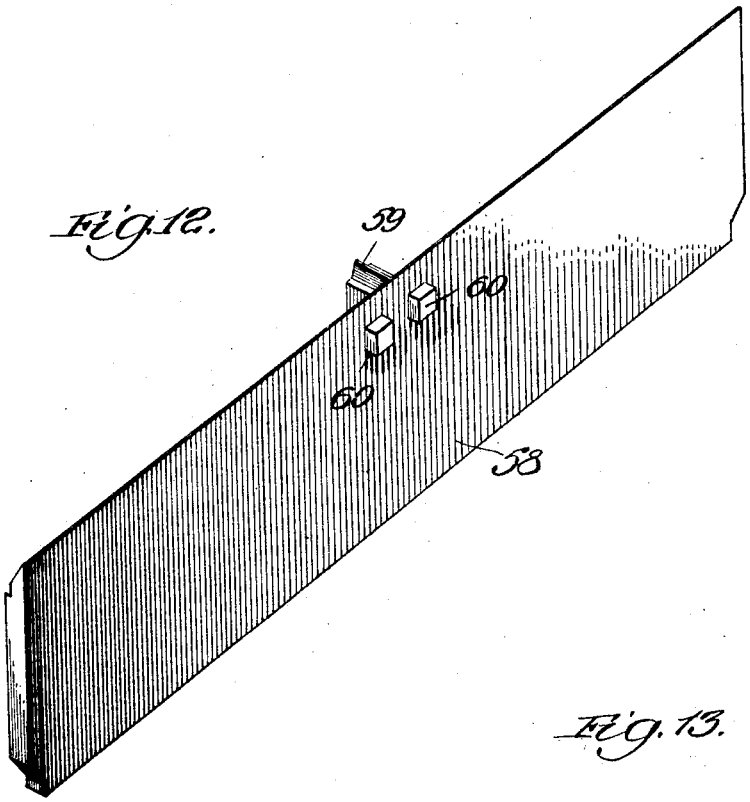
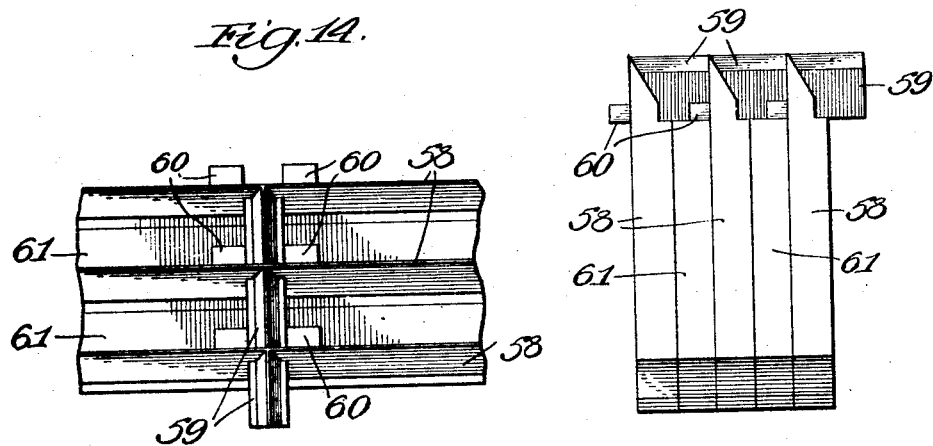
Inventor:
Philip P. Merrill
By Dyrenforth, Lee, Chritton & Wiles
Attys.

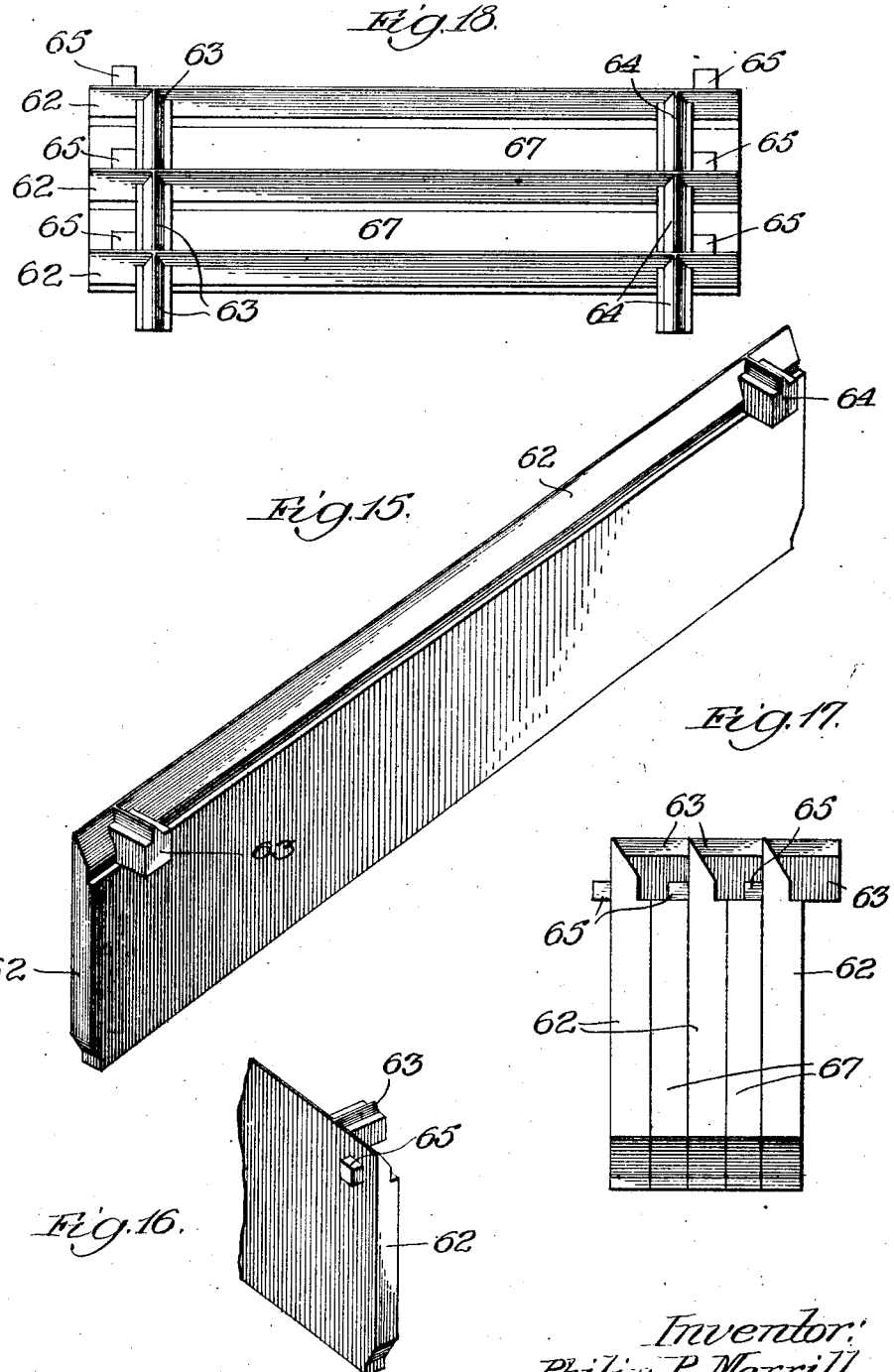

Nov. 15, 1927.
P. P. MERRILL
PRINTING MEMBER
Filed July 3, 1924  6 Sheets-Sheet 6
1,649,539
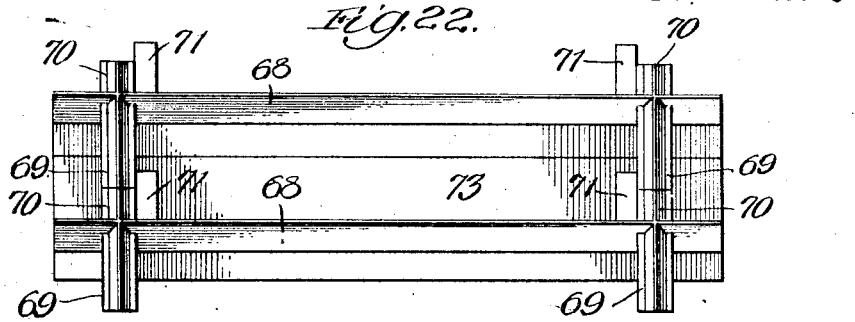
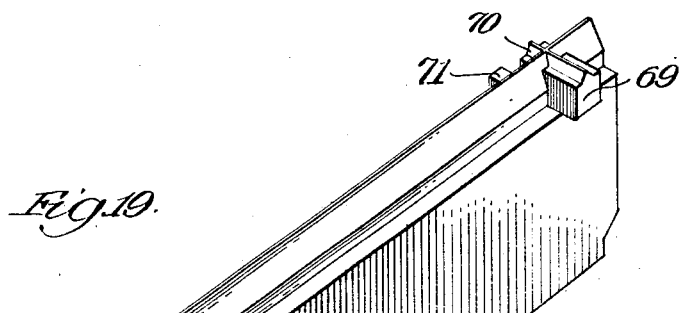
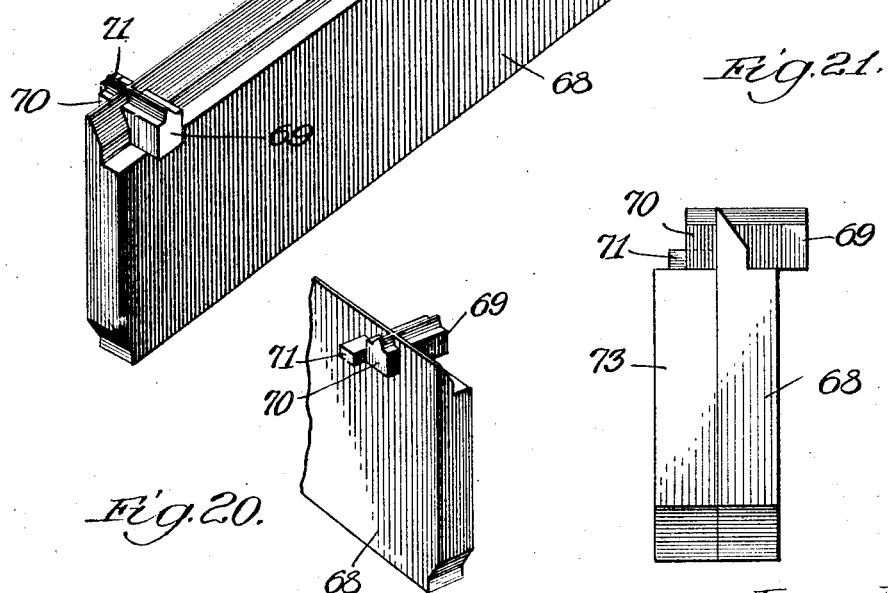
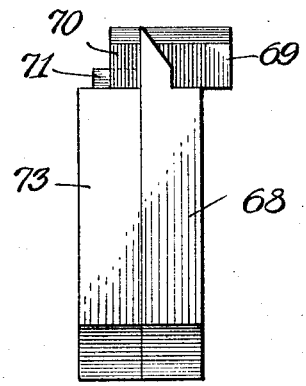
Inventor:
Philip P. Merrill,
By Dyrenforth, Lee, Chritton & Wiles,
Attys.

Patented Nov. 15, 1927.

1,649,539

UNITED STATES PATENT OFFICE.

PHILIP P. MERRILL, OF EVANSTON, ILLINOIS, ASSIGNOR TO LUDLOW TYPOGRAPH COMPANY, OF CHICAGO, ILLINOIS, A CORPORATION OF ILLINOIS.

PRINTING MEMBER.

Application filed July 3, 1924. Serial No. 723,982.

My invention in its broadest aspect relates to printing-face-equipped bodies in general, but more particularly to so-called line-cast slugs each comprising a shank portion which, in accordance with common practice, is cast in a mold provided as one member, and a head-portion, either continuous or interrupted, and presenting a printing-face portion or portions comprising such printing characters as letters, numerals and rule-form elements, and, according to common practice, cast integral with the shank portion and into matrices provided as members separate from the shank-mold member and positioned in alignment with each other at the open side of the mold cavity of the shank-mold member.

My invention further relates to the aligning, either crosswise or lengthwise of the printing-face-equipped bodies, of the printing faces of such bodies when grouped together to present the printing form; and more especially, to the alignment of such faces in a direction crosswise of such bodies, as, for example, in the case of printing bodies for printing "blank forms" and office and factory forms comprising parallel rule lines extending in one direction only, or intersecting parallel rule lines, and in the case of tabular work comprising lines, or columns, of single letters, words or numerals, in all of which cases the accurate alignment of the printing faces of adjacent printing bodies is necessary to produce high grade work.

One of my objects is to provide novel means whereby, without requiring skill or a painstaking operation and regardless of non-alignment of the head-portions of the slugs relative to the shank portions thereof in the case more particularly of line-cast slugs, the alignment of the printing faces on adjacent printing bodies grouped together to produce a printing form, will be ensured.

I have chosen to illustrate my invention as applied to line-cast slugs for the composing of forms from which blanks having intersecting rule lines are to be printed, but without intending to limit my invention thereto.

Figure 2:
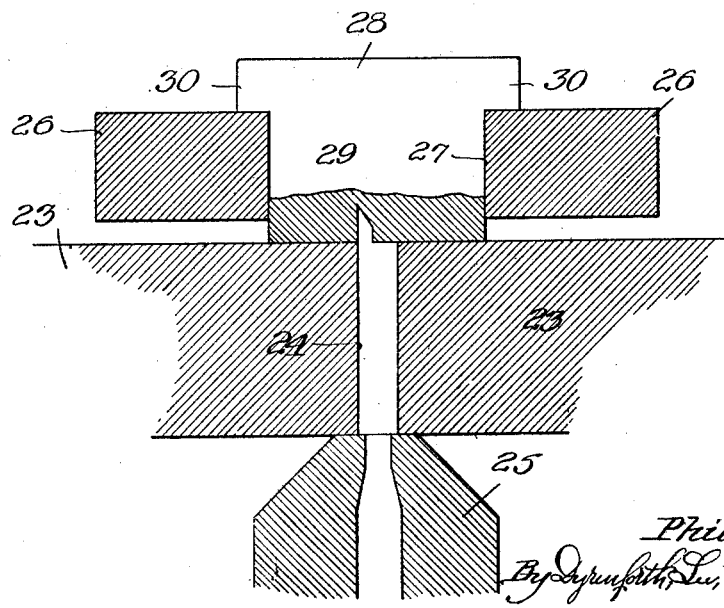

Referring to the accompanying drawings, in which I have shown my improvements in connection with line-cast slugs:

Figure 1 is a perspective view of a mold member in which the shank portion of the line-cast slug is formed, and a matrix-composing stick containing a series of matrices in which the head-portion of the slug is cast, the shank and head-forming portions referred to being shown in separated condition. Figure 2 is a section taken through the assembled members of Fig. 1, these two views being somewhat diagrammatic, with certain parts of the structure with which they are associated in common practice, omitted, sufficient only of the structure being shown to illustrate the application of my invention. Figure 3 is a plan view of a plurality of slugs embodying my invention and provided for the producing of printed rule blanks composed of intersecting rule-faces, these slugs being shown in assembled relation with filler-slugs alternating therewith. Figure 4 is a perspective view of the grouped slugs shown in Fig. 3. Figure 5 is an end view of one of the printing-face-equipped slugs of Fig. 3 and the filler-slug adjacent one face thereof, with portions thereof shown in section, the section being taken at the line 5 on Fig. 3 and viewed in the direction of the arrow. Figure 6 is a perspective view of the sectional matrix from which the intersecting rule-faces of the slugs may be produced. Figure 7 is a face view of one of the sections forming the matrix. Figure 8 is a plan view of an insert-section forming another section of the matrix. Figure 9 is a perspective view of one of the two similar sections constituting the remainder of the matrix-sections. Figure 10 is a perspective view of another construction of matrix which may be used in producing the intersecting rule-face portions of the slug. Fig. 11 is a similar view of the inserts forming parts of the matrix of Fig. 10, these inserts being shown in the spaced relation assumed by them when assembled with the main portion of the matrix. Figure 12 is a perspective view of another form of rule-face line-cast slug embodying my invention. Figure 13 is an end view of a plurality of the slugs of Fig. 12 grouped together in printing position with filler-slugs alternating therewith. Figure 14 is a plan view of the grouped slugs of Fig. 13. Figure 15 is a perspective view of another form of rule-face line-cast slug embodying my invention. Figure 16 is a broken perspective view of the slug of Fig. 15. Figure 17 is an end view of a plurality of the slugs of Fig. 15 grouped together in printing position with filler-slugs alternating therewith. Figure 18 is a plan view of the grouped slugs of Fig. 17. Figure 19 is a perspective view of still another form of rule-face line-cast slug embodying my invention. Figure 20 is a broken perspective view of the slug of Fig. 19. Figure 21 is an end view of the slug of Fig. 19 and a filler-slug grouped therewith; and Figure 22, a plan view of a plurality of the slugs of Fig. 19 arranged in printing position, with filler-slugs grouped therewith.

As a preface to the following description it may be stated, as machines are commonly provided for producing line-cast slugs, the shank-mold portion and the matrices are separate, the shank mold portion being provided on the machine and associated with means for discharging into its mold cavity and into, and against, the matrices, molten metal to form the slug, and the matrices being grouped together in a matrix-composing stick adapted to be positioned on the machine to close the side of the shank-mold and present the mold cavities in the matrices to the metal introduced into the shank mold. Machines of this type being well-known in the art, detailed showing thereof is omitted, only such portions of the machine as are necessary to any understanding of my invention being illustrated. Accordingly a shank-mold member is illustrated somewhat diagrammatically, however, at 23, the mold cavity therein and in which the shank portion of the slug is cast, being shown at 24. This mold cavity opens through the upper surface of the member 23 and receives from the mouth piece 25 of the crucible (not shown) through the lower open end of the mold cavity, the molten slug metal from which the shank and head of the slug are to be formed. A matrix-composing stick is represented at 26, the central opening 27 therein receiving the matrices, represented at 28, shown as formed of the body portions 29, which extend into the opening 27, and the lugs 30 which seat upon the upper surface of the stick 26, the matrices 28, assembled with the stick 26, being held in place therein by a clamping, follower, block 31 cooperating with a clamping screw 32 having threaded engagement with an end portion of the stick 26, the matrices 28 being provided with mold cavities of a contour, or contours, as the case may be, for producing the desired printing face on the line-cast slug to be produced.

The particular form of slug shown in Figs. 3, 4 and 5, at 33, and embodying my invention, is provided for producing blank ruled forms comprising intersecting rule lines, the rule faces on the slugs for printing the horizontal and vertical rule lines being represented at 34 and 35, respectively, these rule faces being provided on, and as a part of, the head portions 36 of the slugs, the shank portions of which are represented at 37.

In accordance with my invention the line-cast slugs are provided with means, preferably of an interlocking character, for insuring such relative positioning of the slugs in grouped relation, that accurate alignment of the printing-faces thereon in a direction crosswise of the slugs will be insured. The particular illustrated form of such means is of the lug and socket type, each line-cast slug being provided with a pair of lugs forming stop portions and represented at 38, these lugs extending from one face of the slug and spaced apart, and with a lug 39, forming a stop portion the upper surface of which presents one section of the printing-face by which the vertical rule line is produced, the lugs 38 being located at opposite sides of, and exactly equidistantly from, the median line of a lug 40 at the face of the slug opposite that having the lug 39, and the upper face of which presents the other section of the printing-face by which said vertical rule is produced, it being understood that the lugs 39 and 40 are in direct alignment with each other. In the particular construction shown the positioning means referred to are provided above the shank portion of the slug on the head portion thereof, these parts being preferably formed by casting the metal forming the head portion into matrices of such contour as to produce the lugs referred to.

Referring now to the matrices for forming the slug, the matrices for forming the rule-faces at the intersections thereof may be of any desired form, two forms suitable for use and one involving my invention being illustrated. The matrix of Figs. 6, 7, 8 and 9 is formed of four plate-sections 41, 42, 43 and 44, the section 41 being formed with a recess 45 in its upper surface and the section 42, which is in the nature of an insert, fitting within this recess and secured therein as by pinning it to the section 41, as represented at 46. The insert-section 42 contains in its upper surface, a longitudinally extending groove 47 and a transverse, intersecting, groove 48 so shaped, as shown, as to form the desired printing rule-faces on that part of the slug which is cast therefrom, the insert-section 42 extending at its top surface below the top surface of the section 41 to form a cavity, partially bounded at its side-portions by the sections 43 and 44 hereafter described, in which the aligning lugs 39 and 40 are cast. The sections 43 and 44, each of the same form, contain recesses 49 formed with portions 50 in their bases which, in the assembled condition of the sections of the matrix in which the sections 43 and 44 flatwise oppose the sections 41 at the opposite faces of the latter, align with the transverse groove 48 of the section 42 and by which, portions of the horizontal rule faces of the slug, are formed. The several sections of the matrix are so recessed that when they are assembled together, as shown in Fig. 6, the recesses 49 extend in staggered relation to the recess 45, as shown, whereby the recesses 49 reach short of one end of the recess 45 but beyond its opposite end. The portion of the cavity of the matrix bounded at one end by an end wall of the recess 45 and at opposite sides by the sections 43 and 44, is the part in which the lug 39 of the slug is cast, and the cavity portions of the matrix each bounded on one side by the section 41 and at one end by an end wall of the recess 49, and, in the assembling of the matrix with the matrices as shown of the matrices in Fig. 1, bounded at another side by an adjacent matrix, are the parts of the matrix in which the lugs 38 are cast.

The matrix of Figs. 10, 11, and 12 differs from the matrix of Figures 7 to 9 inclusive in that it is formed of three sections instead of four, these three sections being represented at 51, 52 and 53, the sections 52 and 53 being insert sections. The section 51 is formed with a recess 54 in its top surface extending throughout the length of this section and substantially of V-shape in cross-section with the walls of this recess, recessed as represented at 55, and presenting substantially V-shaped groove-portions 56 in their bases extending crosswise of the groove-recess 54. The sections 52 and 53 are located in the ends of the groove 54 to extend in spaced apart relation and are rigidly held in position in the section 51 by pins 57. The recesses in the section 51 and the insert sections 52 and 53 are so proportioned and disposed, as shown, as to form a mold cavity of the same shape, and for the same purpose, as in the case of the matrix of Figs. 7 to 9 inclusive.

The matrices for forming the remaining portions of the horizontal rule-faces of the slug would contain mold-cavities corresponding with the mold cavities of the sections 43 and 44 and the upper side walls of the section 51, except for those portions by which the lugs 38 are produced.

In the composing of a printing form from the line-cast slugs shown, the slugs are grouped together, or assembled, as represented in Figs. 3, 4 and 5 with plain filler slugs 33 interposed between adjacent ones of the slugs 33, in which position of the slugs the lugs 39 extend into, and closely fit, the sockets presented between the lugs 38 of adjacent slugs. As the lugs 38 and 39 ooccupy the positions on the slugs, relative to the rule faces 35, as stated, thus positioning the slugs insures accurate alignment of these rule faces to produce perfectly straight, unbroken, rule faces in the printing form, and it is thus immaterial, so far as the aligning of the rule faces 35 is concerned, whether or not the head portions of the slugs accurately align with the shank portions thereof. In effect the inner side-walls of the lugs 38 and the surfaces of the lugs 39 co-operating therewith, as above stated, form cooperating stop surfaces by which the slugs in the operation of assembling them, are caused to become positioned relative to each other for effecting the de-desired alignment of the printing-faces thereof. In this connection it may be stated that under certain conditions satisfactory results may be produced by providing single stop portions on opposing surfaces of the slugs as distinguished from the plural stop-portions shown.

Referring to the construction of printing slugs shown in Figs. 12, 13 and 14, these slugs, represented at 58, are of the same construction as those of the preceding figures, except that the vertical rule-face portion of each thereof instead of being provided on two lugs extending beyond opposite faces of the slug, as in the case of the slug of the preceding figures, is provided on one lug only, forming a stop portion and represented at 59, this lug extending from the face of the slug opposite that carrying the socket-forming lugs and represented at 60, it being understood that the mold cavity of the matrix, whether of either of the constructions shown, or of other construction, for producing this intersecting rule-line portion of the slug, would be provided of the desired shape for forming this part of the slug. The slugs of these figures are shown grouped with filler-slugs 61, alternating therewith, to produce the printing form.

The slugs of Figs. 15 and 22, inclusive, are illustrative of an arrangement of the positioning lugs comprising the lugs bearing rule-face portions, wherein those lugs of the slugs with which the rule-face lugs cooperate, are widely spaced apart, as for example substantially at the ends of the slug, and a plurality of the rule-face lugs are provided.

The printing slugs of Figs. 15, 16, 17 and 18 and represented at 62 are of the same general form as the slugs 58, except that two vertical rule-face lugs, represented at 63 and 64 and having stop portions, are provided adjacent the ends of the slug, instead of a single one, and the two lugs 65 and 66, forming stop portions and corresponding with the lugs 59 of Fig. 12, are widely spaced apart to extend adjacent the ends of the slug and cooperate, respectively, with the outer side-surfaces of the lugs 63 which latter extend beyond the adjacent face of the slug. The intersecting rule-line portions of the slug may be made from any suitable construction of matrix. The matrix construction shown in Figs. 6, 7, 8 and 9, however, is particularly desirable for use in this connection, inasmuch as each of the intersecting rule-line matrices may be made up by using one of the sections 41 and one of the similar sections 43 or 44. The slugs of these figures are likewise shown grouped with filler-slugs 67 alternating therewith to produce the printing form.

The printing slugs of Figures 19 and 21, inclusive, and represented at 68 are of the same construction as those of Figs. 15 to 18, inclusive, except that the vertical rule-face portions of the slugs are each formed on two lugs 69 and 70 forming stop portions and extending beyond opposite faces of the slug, as in the case of the construction shown in Figs. 3, 4 and 5, instead of being provided on one lug only, and the lugs, represented at 71 and 72 and corresponding with the lugs 65 and 66, while widely spaced apart, are located at the inner side-walls of the rule-face lugs 69, instead of at the outer side-walls thereof, the matrix-sections being suitably arranged in the matrix composing stick to produce the lugs as stated. The slugs of these figures are also shown grouped together with filler-slugs 73 interposed therebetween.

While I have illustrated and described my invention as embodied in, and applied to the production of, certain forms of printing-face-equipped bodies, I do not wish to be understood as intending to limit it thereto, nor to the particular printing-faces shown, as the invention as to certain phases thereof, may be embodied in, and employed in the production of, various other forms of printing-face-equipped bodies and various other printing-faces where it is desired that alignment of printing-faces on adjacent printing-face-equipped bodies be effected.

What I claim as new, and desire to secure by Letters Patent is:

1. A printing-face-equipped body provided at one surface thereof with a stop portion presenting a printing face and at its opposite surface with a stop portion, said stop portions extending beyond said surfaces, for the purpose set forth.

2. A printing-face-equipped body provided at one surface thereof with a stop-portion extending crosswise of said body and presenting a printing face, and at its opposite surface with a stop portion, said stop portions extending beyond said surfaces, for the purpose set forth.

3. A printing-face-equipped body provided at one surface thereof with a stop-portion extending beyond said surface and presenting a printing face, and at its opposite surface with a stop portion, for the purpose set forth.

4. A printing-face-equipped body provided at one surface thereof with a stop-portion extending beyond said surface and presenting a printing face, and at its opposite surface with a stop portion extending beyond the adjacent surface of said body.

5. A printing-face-equipped body provided at one surface thereof with a stop-portion extending crosswise of said body and beyond said surface, and at its opposite surface with a stop portion, for the purpose set forth.

6. A printing-face-equipped body provided at each of opposite surfaces thereof with a plurality of stop-portions extending beyond said surfaces, the stop-portions at one surface of said body presenting a printing face, for the purpose set forth.

7. A printing-face-equipped body provided at opposite surfaces thereof with lug and socket stop-forming portions, respectively, said lug portion presenting a printing face, for the purpose set forth.

8. A plurality of printing-face-equipped bodies adapted to be assembled to produce alignment of printing faces thereon and provided with stop-portions in co-operative relation on opposing surfaces thereof, one of said portions presenting a printing face, for the purpose set forth.

9. A plurality of printing-face-equipped bodies adapted to be placed flatwise together to produce alignment of printing faces thereon and provided with stop portions in co-operative relation on opposing surfaces thereof, one of said portions presenting a printing face, for the purpose set forth.

10. A plurality of printing-face-equipped bodies adapted to be assembled to produce alignment of printing-faces thereon and provided with stop-portions in co-operative relation on opposing surfaces thereof, each of said bodies being provided with a plurality of said stop-portions, on each surface, the stop portions on one surface of said body presenting a printing face, for the purpose set forth.

11. A plurality of printing-face-equipped bodies adapted to be assembled to produce alignment of printing-faces thereon and provided with lug and socket portions in co-operative relation on opposing surfaces thereof, said lugs presenting printing faces, for the purpose set forth.

12. A plurality of printing-face-equipped slugs grouped in flatwise opposed relation, with filler slugs interposed therebetween, each of said first-referred-to slugs being provided with stop-portions at opposite surfaces thereof, with the stop-portions on each slug extending in mutually overlapped relation with the stop-portions on adjacent slugs, certain of said stop-portions being in the form of printing-face-equipped lugs overlapping adjacent ones of said filler-slugs.

13. A plurality of printing-face-equipped slugs grouped in flatwise opposed relation, with filler slugs interposed therebetween, each of said first-referred-to slugs being provided at each of opposite surfaces thereof with stop-portions, with the stop-portions on each slug extending in mutually overlapped relation with the stop portions on adjacent slugs, certain of said stop-portions being in the form of printing-face-equipped lugs overlapping the adjacent ones of said filler slugs.

14. A printing-face-equipped body provided at one surface thereof with a stop-portion presenting a printing-face and at its opposite surface with a stop portion, for the purpose set forth.

15. A printing-face-equipped body provided at each of opposite surfaces with stop-portions the stop-portions at one surface of said body presenting a printing face.

16. A printing-face-equipped body provided at one surface thereof with a stop-portion presenting a printing-face and at its opposite surface with a stop-portion, said stop portions presenting stop-surfaces extending in planes crosswise of the plane of the printing-face.

17. A plurality of printing-face-equipped bodies of substantially the same height adapted to be assembled to produce a printing form, and means comprising co-operating portions of said bodies, one of said portions presenting a printing face, for producing pre-determined positioning of said bodies relative to each other in the plane of their printing surfaces.

18. A plurality of printing-face-equipped bodies grouped together to produce a printing form, said bodies being provided with cooperating stop portions certain of which present a printing face, said stop portions being so disposed as to cause printing faces on said bodies to aline within the plane of the printing surface.

PHILIP P. MERRILL.